Dec. 23, 1924.  W. H. MOYSE  1,520,677
ADJUSTABLE STEERING COLUMN FOR AUTOMOBILES
Filed Dec. 12, 1923
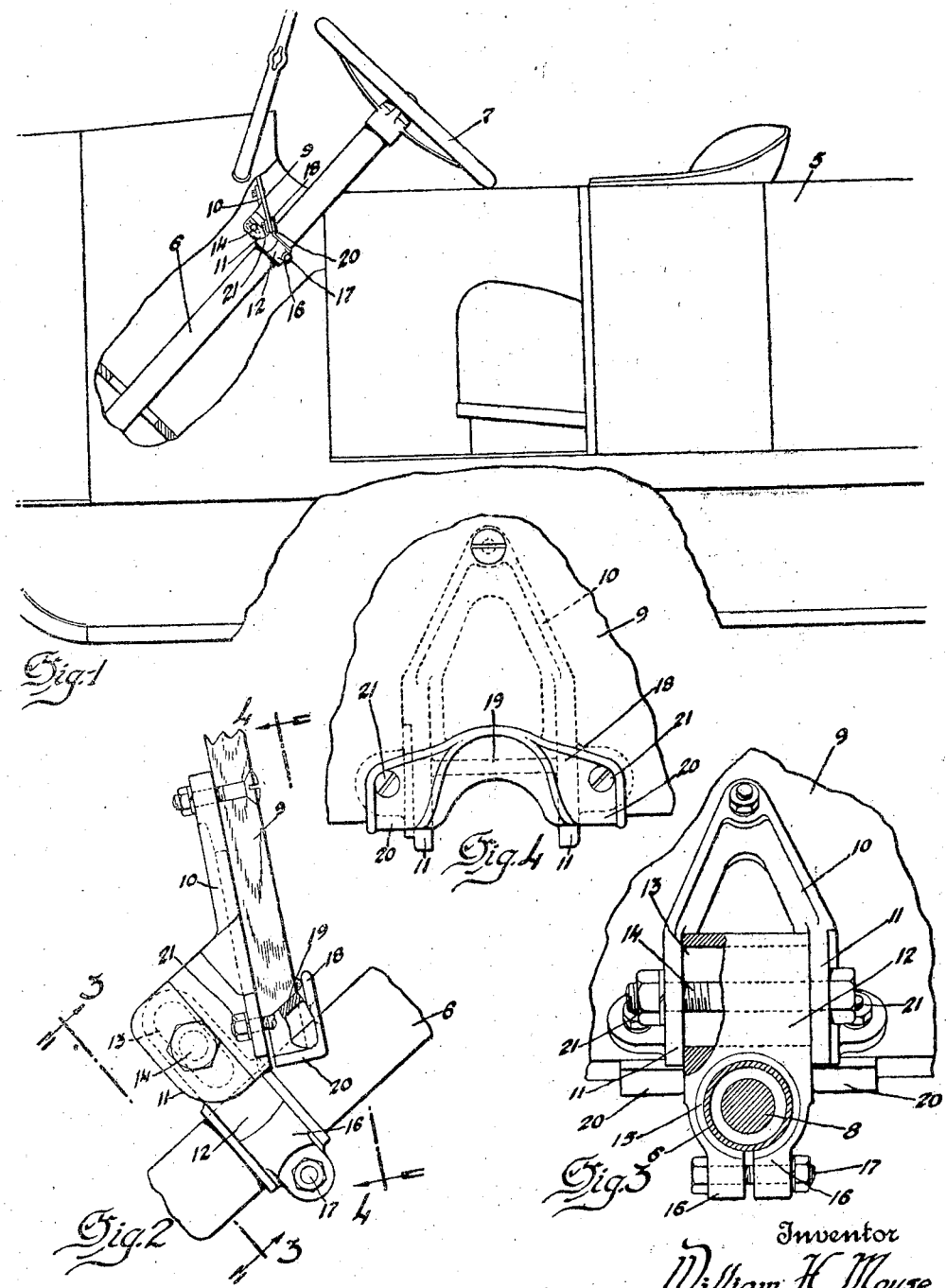
Inventor
William H. Moyse
By his Attorneys Patented Dec. 23, 1924.

1,520,677

UNITED STATES PATENT OFFICE.

WILLIAM H. MOYSE, OF OSHAWA, ONTARIO, CANADA, ASSIGNOR TO GENERAL MOTORS CORPORATION, OF DETROIT, MICHIGAN, A CORPORATION OF DELAWARE.

ADJUSTABLE STEERING COLUMN FOR AUTOMOBILES.

Application filed December 12, 1923. Serial No. 680,136.

*To all whom it may concern:*

Be it known that I, WILLIAM H. MOYSE, a subject of the King of Great Britain, and a resident of Oshawa, Province of Ontario, Dominion of Canada, have invented certain new and useful Improvements in Adjustable Steering Columns for Automobiles, of which the following is a full, clear, concise, and exact description, such as will enable others skilled in the art to which the invention relates to make and use the same, reference being made therein to the accompanying drawings, which form a part of this specification.

My invention relates to adjustable steering columns or posts for automobiles and similar self propelled vehicles; and the object thereof is to provide improved means for permitting the angularity of the post to be readily varied, and for holding the same securely in whatever position it may be placed; to thereby vary the position of the steering wheel at the upper end of the steering column relative to the driver of the vehicle. Such adjustable steering columns are of particular importance in vehicles wherein the front or driver's seat is adjustable longitudinally of the body of the vehicle to thereby position him closer to or further from the column; in which case, and in order to secure maximum advantage from the adjustable seat feature and of convenience to the operator, it is important and in fact necessary that the position of the steering column shall be capable of variation along with the position of the seat so as to adapt it to various seat positions. My invention, however, is equally capable of use with seats which are not adjustable; as the advantages of convenient adjustability of the steering column and of means for holding the same securely in whatever position it may be placed, with concomitant positioning of the steering wheel in a position best suited to the operator of the vehicle, will be secured in part by the use of my invention even though the driver's seat be not adjustable.

The drawing accompanying and forming a part of this specification illustrates the preferred form of my invention; although the same may be embodied in various other forms so long as such forms come within the scope of the concluding claims, wherein the distinguishing features in which my invention consists are particularly pointed out.

In the drawing wherein like reference numerals designate the same parts and features in the several views:

Figure 1 is a fragmentary view in side elevation showing so much of an automobile, with my invention applied thereto, as is necessary to an understanding of my invention.

Figure 2 is a similar view showing the principal features of my invention upon a larger scale.

Figure 3 is a view showing a section upon a plane indicated by the line 3, 3, Figure 2, parts beyond said plane appearing in elevation.

Figure 4 is a view similar to Figure 3 but looking in the opposite direction, as indicated, respectively, by the arrows thereupon; the plane of this view being indicated by the line 4, 4, Figure 2 although certain of the parts which would naturally appear in this view are omitted to avoid confusion.

Referring now to the drawing, the reference numeral 5 designates a portion of the body of an automobile, and 6 the steering post or column having the usual steering wheel 7 at its upper end; the said column being commonly more or less inclined as shown, and comprising, in the embodiment of my invention illustrated, an outer stationary tube and an inner angularly rotatable rod 8 through which movement is communicated, through the usual steering mechanism, to the front wheels of the vehicle to steer the same. In some cases, however, the tube itself or an equivalent steering member is angularly movable to effect the steering of the vehicle and my invention, regarded in its broader aspect, is applicable to adjustable steering members irrespective of the forms of said members in any particular case.

The lower and forward end of the steering member is commonly secured to the frame of the vehicle through a housing or support which permits a limited swinging movement of the upper end thereof, in order that the same may be properly adapted to the body of the vehicle, and provision is also commonly made for adjusting the column or post to thereby vary to a certain degree the position of the steering wheel relative to the driver of the vehicle, and my invention consists in and the object thereof is to provide improved means for facilitating such adjustment, and for holding the upper end of the steering column in whatever position it may be placed.

The numeral 9 designates a fixed support to which the upper end of the steering column is fastened after it has been properly adjusted relative to said support; said supporting member in the embodiment of my invention illustrated being the usual vertically arranged instrument supporting board extending transverse to the vehicle body and lying above the steering column, and adapted to support the various indicating instruments with which motor driven vehicles are commonly equipped.

Secured to the supporting member 9, preferably upon the front side thereof, is a bracket 10 which lies above the steering column and adjacent its upper end, and which bracket is provided adjacent its lower end with two side members 11, 11 spaced apart from one another, and shown as downwardly inclined and as extending forward from the main body of the bracket and from the instrument board substantially parallel with one another; and which arms obviously lie above and adjacent the upper end of the steering column or post to be held in place relative to the supporting member or instrument board.

The steering column 6 is fixedly held in whatever position it may be placed in by the bracket and supporting member as fixed elements constituting a primary support for the column, through and by means of a holding member 12 which is secured to and moves with the steering column as it is adjusted; and the upper end of which slides between the side members of the bracket 10 during the movement incident to such adjustment. Said upper end is provided with an elongated slot 13 through which and through holes in the side members 11, 11 a clamping bolt 14 extends. Obviously when the bolt is loosened the steering column may be swung to an extent limited by engagement of the ends of the slot with the bolt to thereby adjust the column and steering wheel, the holding member 12 moving with the steering column at such times; and obviously the holding member and column may be held immovably in any position, within the limits referred to, by tightening the bolt and thus clamping the upper and rear end of the holding member between the sides of the bracket.

The holding member 12 may be secured to the steering column 6 in various ways. Thus in the form of my invention illustrated the lower end of said member is bifurcated, and the arms thus formed so shaped as to provide a circular seat 15 fitting about the column; the ends 16, 16 of the arms of said member being drawn together, and the member itself firmly clamped to the steering column, by a bolt 17 extending through holes adjacent the ends of the arms, as shown. The slot 13 is wider than the diameter of the bolt 14 so that in adjusting the column and after the nut upon said bolt has been loosened, the steering column may be swung back and forth within the limits imposed by the length of the slot 13 without bringing about binding action between the bolt and the sides of the slot. Then when the column has been properly positioned the nut upon the bolt 14 will be tightened, thus securing the steering column in the position in which it is placed.

The reference numeral 18 designates an escutcheon plate having an upwardly flared and curved central portion 19 designed to fit as closely as permissible about the upper side of the steering column, to present a more finished appearance at the point where the column passes beneath the lower edge of the instrument board; said curved portion extending forwardly through a recess cut in the lower edge of the instrument board and merging with bottom walls 20, 20 which lie beneath the lower edge of the board at the sides of the upwardly curved and flared portion 19. Said escutcheon plate is provided with holes adjacent its ends registering with holes in the instrument board and in the bracket 10, and bolts 21, 21 extend through said holes to hold the plate and bracket assembled with the board, as will be understood.

Having thus described and explained my invention I claim and desire to secure by Letters Patent of the United States:

1. In a device for holding the upper end of an inclined adjustable steering column in various positions and in combination with a transversely extending supporting member of a vehicle body, a bracket secured to said supporting member and located above said steering column, and having parallel side members spaced apart from one another; a holding member having a split seat shaped to conform to said column, and a bolt for contracting the sides of said seat to thereby clamp said holding member upon said steering column, and which holding member extends upwardly from said steering column and has a slotted upper end which lies between the side members aforesaid of said bracket; and a fastening bolt extending through holes in said side members and through said slot.

2. In a device for holding the upper end of an inclined adjustable steering column in various positions and in combination with a transversely extending supporting member of a vehicle body, a bracket secured to said supporting member and located above said steering column, and having parallel side members extending laterally therefrom and located adjacent its lower end; a holding member having a split seat shaped to conform to said column, and a bolt for contracting the sides of said seat to thereby clamp said holding member upon said steering column, and which holding member extends upwardly from said steering column and has a slotted upper end which lies between the side members aforesaid of said bracket; and a fastening bolt extending through holes in said side members and through said slot.

3. In means for holding the upper end of an adjustable steering column in various positions, a supporting member extending transverse to and lying above the column to be held; a bracket secured to said supporting member and having parallel side members extending laterally therefrom and located adjacent its lower end and adjacent the lower end of said supporting member; a holding member secured to said column and having a slotted upper end portion lying between the side members aforesaid of said bracket; and a fastening bolt extending through holes in said side members and through said slot.

4. In means for holding the upper end of an inclined adjustable steering column in various positions, a vertically arranged instrument board extending transverse to and arranged above the column to be held; a bracket secured to said board and having parallel side members extending laterally therefrom and located adjacent the lower end and adjacent the lower edge of said board; a holding member having a split seat shaped to conform to said column, and a bolt for contracting the sides of said seat to thereby clamp said holding member upon said steering column, and which holding member extends upwardly from said steering column and has a slotted upper end which lies between the side members aforesaid of said bracket; and a fastening bolt extending through holes in said side members and through said slot.

5. In means for holding the upper end of an inclined adjustable steering column in various positions, a vertically arranged instrument board extending transverse to and located above the column to be held; a bracket upon the front side of said board and having side members spaced apart from one another and located adjacent the lower edge of said board; a holding member secured to said column and having a slotted upper end portion lying between the side members aforesaid; a fastening bolt extending through holes in said side members and through said slot; an escutcheon plate upon the rear side of said board adjacent the lower edge thereof and above and adjacent said steering column; and fastening bolts extending through holes in said bracket, said board and said plate for fastening said bracket and plate to said board.

6. In means for holding the upper end of an inclined adjustable steering column in various positions, a vertically arranged instrument board extending transverse to and located above the column to be held; a bracket upon the front side of said board and having forwardly extending side members spaced apart from one another and located adjacent the lower edge of said board; a holding member secured to said column and having a slotted upper end portion lying between the side members aforesaid; a fastening bolt extending through holes in said side members and through said slot; an escutcheon plate upon the rear side of said board adjacent the lower edge thereof, and having a central upwardly curved portion fitting about the upper side of said steering column; and fastening bolts extending through holes adjacent the ends of said plate, and through holes in said board and bracket for fastening said bracket and plate to said board.

In testimony whereof I affix my signature.

W. H. MOYSE.